(12) United States Patent
Choi

(10) Patent No.: US 7,724,275 B2
(45) Date of Patent: May 25, 2010

(54) IMAGE FORMING APPARATUS AND CONTROL METHOD THEREOF

(75) Inventor: An Sik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 12/041,934

(22) Filed: Mar. 4, 2008

(65) Prior Publication Data

US 2008/0225321 A1   Sep. 18, 2008

(30) Foreign Application Priority Data

Mar. 15, 2007   (KR) ...................... 10-2007-0025623

(51) Int. Cl.
*B41J 2/435* (2006.01)
*B41J 2/47* (2006.01)

(52) U.S. Cl. ...................... 347/235; 347/250

(58) Field of Classification Search ................. 347/116, 347/229, 234, 235, 248–250
See application file for complete search history.

(56) References Cited

U.S. PATENT DOCUMENTS

| 5,291,222 | A  | * | 3/1994  | Ohashi ................. 347/248 |
| 6,259,467 | B1 | * | 7/2001  | Hanna .................. 347/249 |
| 6,404,448 | B1 | * | 6/2002  | Toda ................... 346/116 |
| 6,847,390 | B2 | * | 1/2005  | Maeda .................. 347/250 |
| 2003/0001686 | A1 | | 1/2003 | Sekiya |
| 2004/0196507 | A1 | | 10/2004 | Sakai |
| 2006/0243886 | A1 | | 11/2006 | Nomura et al. |

FOREIGN PATENT DOCUMENTS

| EP | 1622355 | 2/2006 |
| JP | 11-055472 | 2/1999 |
| JP | 2004-219849 | 8/2004 |

OTHER PUBLICATIONS

Office Action issued in corresponding European Patent Application No. 08152407.6 dated Jun. 24, 2008.

* cited by examiner

*Primary Examiner*—Hai C Pham
(74) *Attorney, Agent, or Firm*—Staas & Halsey LLP

(57) ABSTRACT

An image forming apparatus including: optical sensor to receive a bias current and to divide the bias current into two output currents, according to positions of a light beam on the optical sensor; and a signal processor to detect horizontal synchronization signals using the output currents, to calculate a positional deviation of the horizontal synchronization signals, and to control a recording time of video data according to the positional deviation.

20 Claims, 5 Drawing Sheets

IMAGE FORMING APPARATUS AND CONTROL METHOD THEREOF

CROSS-REFERENCE TO RELATED APPLICATION

This application claims the benefit of Korean Application No. 2007-25623, filed Mar. 15, 2007, in the Korean Intellectual Property Office, the disclosure of which is incorporated herein by reference.

BACKGROUND OF THE INVENTION

1. Field of the Invention

Aspects of the present invention relate to an image forming apparatus capable of correcting the record timing of video data based on position deviation of horizontal synchronization signals, and a control method thereof.

2. Description of the Related Art

An electro-photographic type image forming apparatus forms an electrostatic latent image on a photoreceptor by using light beam radiated from a laser scanning unit. The image forming apparatus applies toner to the electrostatic latent image, to form a toner latent image, and then transfers the toner latent image to a printing medium, such that a desired image is printed on the printing medium.

A laser scanning unit outputs horizontal synchronization signals that indicate the start of scanning lines. As the horizontal synchronization signals are supplied to a video controller, video data, corresponding to one scanning line stored in a memory, is supplied to the laser scanning unit. A light source repeatedly turns on and off in correspondence with the supplied video data, so that the image corresponding to the video data is formed.

A positional deviation of horizontal synchronization signals may occur, due to vibrations generated when a laser scanning unit operates. In addition, since a color image forming apparatus can have multiple laser scanning units for different colored toners, the locations of the horizontal synchronization signals, generated according to colored toners, must be precisely aligned to complete the image, by overlapping the different toners. In this regard, a color image forming apparatus prints a test pattern and then performs a color registration, by analyzing the test pattern, to correct the color positions.

A color registration generally must be performed whenever a printing operation is performed for a certain time period, and a process of printing a test pattern on a printing medium, and scanning/analyzing the printed test pattern, should be carried out, to perform the operation. Therefore, there is a problem in that the signal processing load for test pattern analysis is weighted.

In order to solve such a problem, Japanese Unexamined Patent Publication No. 11-55472 discloses a method for counting the scanning time of a laser beam, from a point in time when horizontal synchronization signals are detected by a synchronization detecting sensor, to a point in time when termination signals are detected by a termination detecting sensor. The timing of data recorded on a scanning surface is corrected, according to results obtained by comparing the counted scanning time with a reference value. According to Japanese Unexamined Patent Publication No. 11-55472, the method is simpler than the conventional color registration method. However, since a reference clock with a high frequency should be used to determine a scanning time counted from a synchronization detection time to a scanning termination time, whenever a line is scanned, a process of storing information counted using such a reference clock is required. In addition, components for implementing the process should be added to an apparatus, and a high signal processing load is encountered. Further, the apparatus is uneconomical because a termination detecting sensor is provided to determine a scanning termination, which is in addition to a synchronization detecting sensor.

Japanese Unexamined Patent Publication No. 2004-219849 discloses a method in which a cylindrical lens, having a negative power in the main scanning direction, is additionally installed with an optical sensor to receive horizontal synchronization signals. The lens corrects the timing of data, based on a positional deviation of the horizontal synchronization signals. When the cylindrical lens is used, the important point is to prevent the timing of the data from deviating from a reference, due to the positional deviation of the horizontal synchronization signals, which may occur in each scanning line. Thus, such a method has difficulty in exactly correcting the positional deviation of the horizontal synchronization signals, thereby limiting the output of high-quality images.

SUMMARY OF THE INVENTION

Aspects of the present invention relate to an image forming apparatus capable of outputting high-quality images, by correcting a recording time of video data, based on a positional deviation of horizontal synchronization signals, and a control method thereof.

Aspects of the present invention relate to an image forming apparatus comprising: a light source; an optical sensor to output a plurality of output currents, according to positions of light beams incident from the light source; a signal processor to output horizontal synchronization signals and correction signals, based on the output currents of the optical sensor; and a video controller to control a recording time of video data, at which the video data is recorded on a scanning surface, based on the horizontal synchronization signals and the correction signals. The horizontal synchronization signals each indicate the start of a scanning line of video data, and the correction signals correct a positional deviation of the horizontal synchronization signals.

According to aspects of the present invention, the video controller controls the recording time of the video data, based on the positional deviation, and continuously sets the recording time of the video data of each scanning line.

According to aspects of the present invention, the signal processor comprises: a synchronization start position signal detector, to detect synchronization start position signals (pulses) corresponding to a start position of the horizontal synchronization signals, by using the output currents output from the optical sensor; and a positional deviation detector to calculate the correction signals from a positional deviation, which corresponds to a difference between a start position of a previous horizontal synchronization signal and a start position of current horizontal synchronization signal. The positional deviation detector provides the correction signals to the video controller, in which the previous horizontal synchronization signal and the current horizontal synchronization signal are provided, by the synchronization start position signal detector.

According to aspects of the present invention, the signal processor further comprises a synchronization signal detector that forms the horizontal synchronization signals, by using the output currents output from the optical sensor.

According to aspects of the present invention, the image forming apparatus comprises a plurality of optical sensors, for different colored toners.

According to aspects of the present invention, the optical sensor has an optical reaction area, to receive a light beam on a surface thereof, and comprises first and second input terminals.

According to aspects of the present invention, the optical sensor divides a bias current, which is input through the input terminal, into two output currents, according to the light beam incident to the optical reaction area, and then outputs the two output currents through the two output terminals.

According to aspects of the present invention, the optical sensor calculates a position T of the horizontal synchronization signals, by using two output currents Y1 and Y2, based on an equation $(L/2)*[(Y1-Y2)/(Y1+Y2)]$, in which L is length of the optical reaction area, and (Y1+Y2) corresponds to the horizontal synchronization signals.

According to aspects of the present invention, provided is an image forming apparatus comprising: a light source to radiate a light beam; an optical sensor having an optical reaction area, to receive the light beam, and to output two output currents through two output terminals by dividing a bias current, which is input through one input terminal; a signal processor to detect horizontal synchronization signals indicating a start of a scanning line and synchronization start position signals (synchronization start pulses) corresponding to a start position of the horizontal synchronization signals, from the output currents of the optical sensor. The signal processor is also to output a positional deviation, corresponding to a difference between a start position of the previously detected horizontal synchronization signal and a start position of current horizontal synchronization signal. The image processing apparatus further comprises a video controller, to control a recording time of video data, at which the video data is recorded on a scanning surface, based on the horizontal synchronization signals and the positional deviation.

According to aspects of the present invention, provided is a method for controlling the image forming apparatus, comprising: detecting horizontal synchronization signals from the output currents of the optical sensor; detecting synchronization start pulses corresponding to a start position of the horizontal synchronization signals; computing positional deviations, corresponding to a difference between the detected horizontal start pulses; and controlling a recording time of video data, based on the horizontal synchronization signals and the positional deviation.

According to aspects of the present invention, the positional deviation corresponds to a difference between a start position of previously detected horizontal synchronization signals and a start position of current horizontal synchronization signals.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EXEMPLARY EMBODIMENTS

Figure 1:
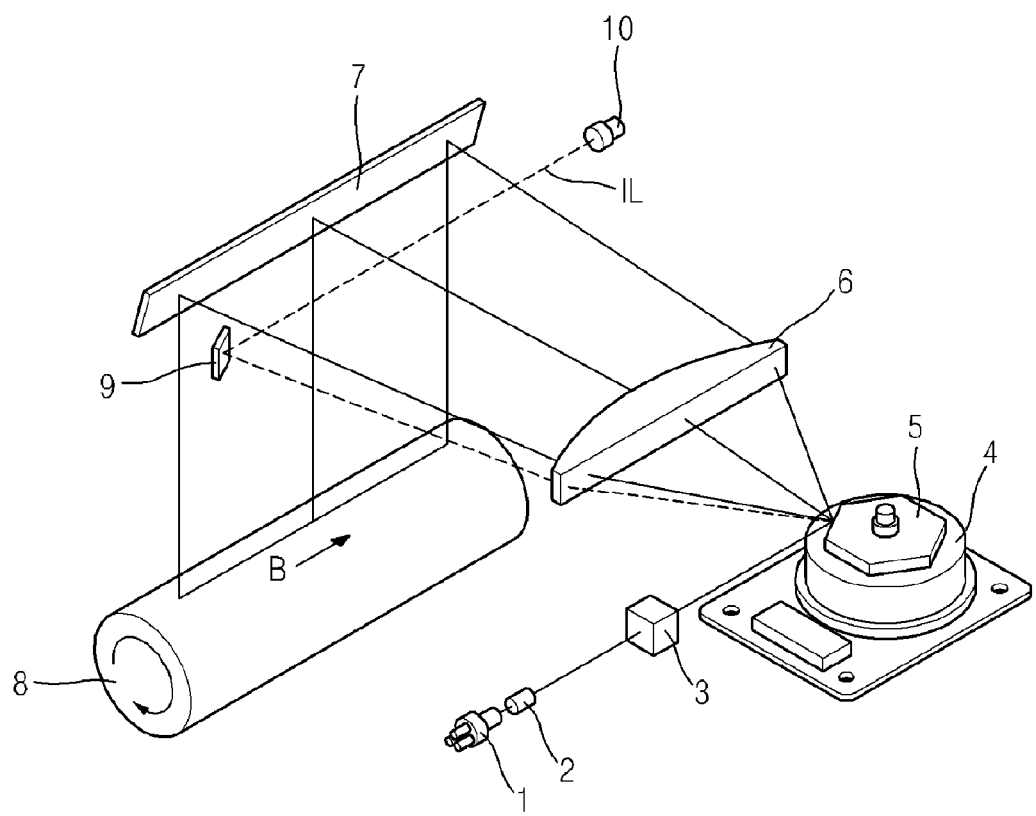
FIG. 1 is a view illustrating a laser scanning unit of an image forming apparatus, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

As illustrated in FIG. 1, a laser scanning unit 100 of an image forming apparatus, according to aspects of the present invention, comprises a light source 1, a collimator lens 2, a cylinder lens 3, a polygonal mirror 5, a driving motor 4, a fθ lens 6, a reflection mirror 7, a photoreceptor 8, a horizontal synchronization mirror 9, and an optical sensor 10. While not required, it is understood that the laser scanning unit 100 can be used in a laser printer or in a multifunctional device having a scanning, copying, and/or facsimile capacity.

The light source 1 radiates a light beam and can be, for example, a laser diode, or the like. The collimator lens 2 converts the light beam radiated from the light source 1 into collimated light. The cylinder lens 3 converts the collimated light into linear light that is perpendicular to a scanning direction.

The polygonal mirror 5 moves to scan the linear light at a constant linear velocity, using a plurality of inclined surfaces. The driving motor 4 rotates the polygonal mirror 5 at a constant linear velocity. The fθ lens 6 polarizes the light reflected from the polygonal mirror 5, which scans at the constant linear velocity in the scanning direction. The reflection mirror 7 vertically reflects the light beam from the fθ lens 6, such that a point image can be formed on a surface of the photoreceptor 8.

Before a light beam, corresponding to video data of one line, is radiated, the light source 1 outputs a light beam as a horizontal synchronization signal, and the optical sensor 10 receives the light beams reflected by the horizontal synchronization mirror 9. The signal is shown as a dashed line in FIG. 1 and passes through the fθ lens 6 to an area that does not reach the photoreceptor 8 but is reflected by the mirror 5.

Figure 2:
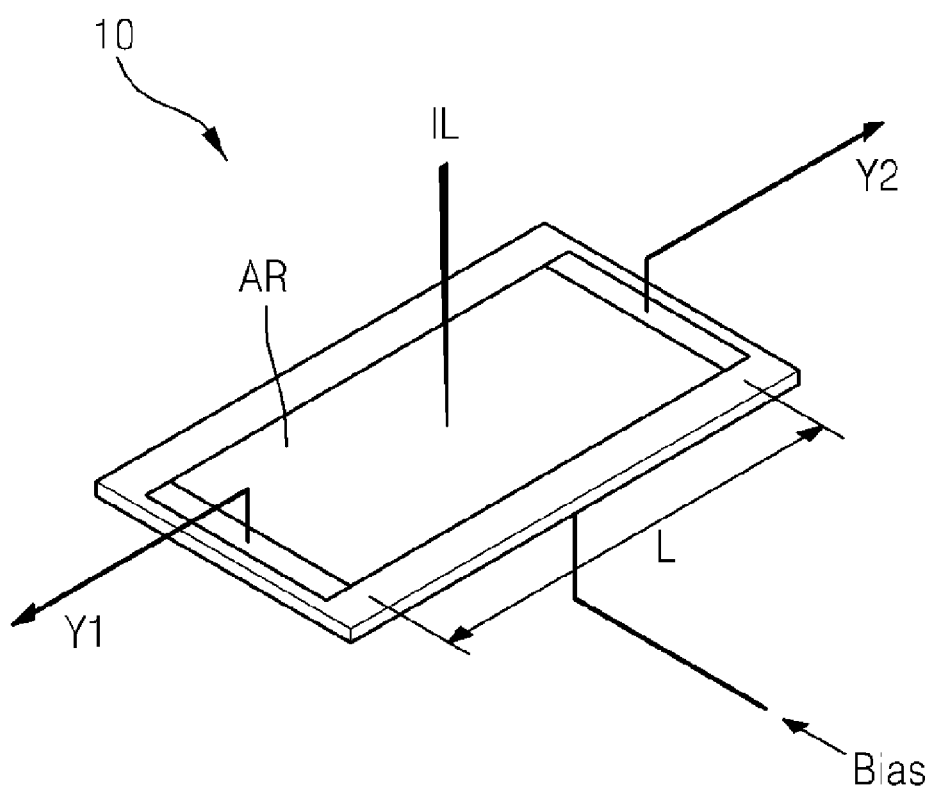
FIG. 2 is a view illustrating an optical sensor employed in an image forming apparatus, according to the present invention.

As illustrated in FIG. 2, the optical sensor 10 has an optical reaction area AR, to receive the light beam, one input terminal, and two output terminals. The optical sensor 10 can be a position sensing detector (PSD) to detect a position of the light beam. A bias current is input through the input terminal and is output as two output currents Y1 and Y2, through the two output terminals, according to a light beam IL, incident to the optical reaction area AR of the optical sensor 10. The two output currents change depending on the position of the light beam IL. The position T of horizontal synchronization signal can be calculated by the following Equation 1, using a relationship between the two output currents Y1 and Y2, according to the position of the light beam IL.

$$T=(L/2)*[(Y1-Y2)/(Y1+Y2)]$$ Equation 1

In the Equation 1, L is the length of the optical reaction area and (Y1+Y2), and corresponds to the horizontal synchronization signal.

The horizontal synchronization signal can be formed using the output currents of the optical sensor 10. The start positions of the horizontal synchronization signals can be set, so that the output timing of video data can be corrected, by using a difference between start positions thereof, calculated based on a horizontal synchronization start position generated from each scanning line.

Figure 3:
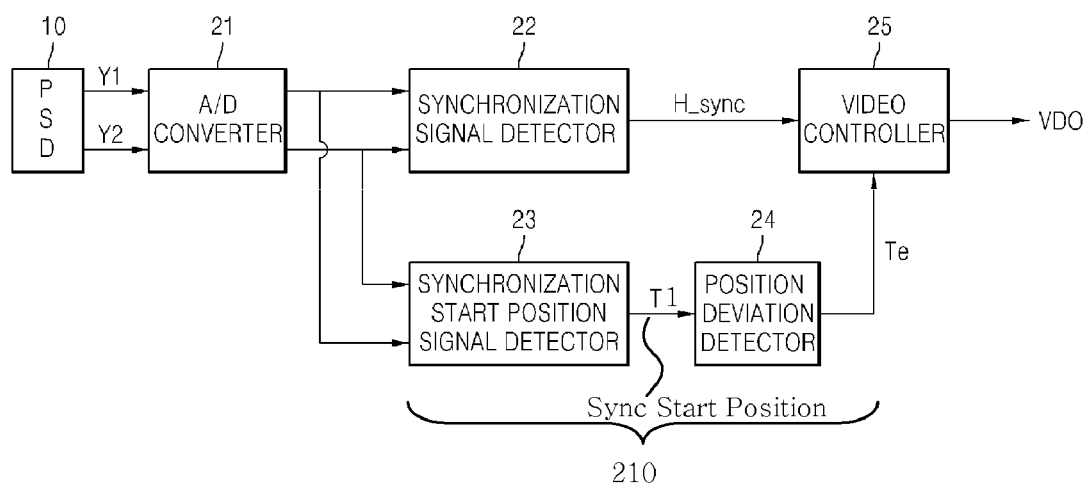
FIG. 3 is a block diagram illustrating an image forming apparatus, according to an exemplary embodiment of the present invention.

FIG. 3 illustrates an image forming apparatus 200, comprising: an optical sensor 10 (PSD); an A/D converter 21; and a signal processor 210. The signal processor 210 comprises a synchronization signal detector 22; a synchronization start position signal detector 24; a positional deviation detector 24; and a video controller 25. As illustrated in FIGS. 1 and 3, when the laser scanning unit 100 outputs a light beam as horizontal synchronization signals, in order to scan video data of one scan line, the optical sensor 10 receives the light beam, amplifies the two output currents Y1, Y2, and provides the amplified currents to the A/D converter 21.

The A/D converter 21 digitally converts the two amplified output currents Y1 and Y2 and provides the converted currents to the synchronization signal detector 22 and the synchronization start position signal detector 23.

The synchronization signal detector 22 detects the horizontal synchronization signal H_sync, using the two output currents Y1 and Y2, and provides the detected horizontal synchronization signals H_sync to the video controller 25. The video controller 25 provides the laser scanning unit 100 with video data VDO.

Figure 4:
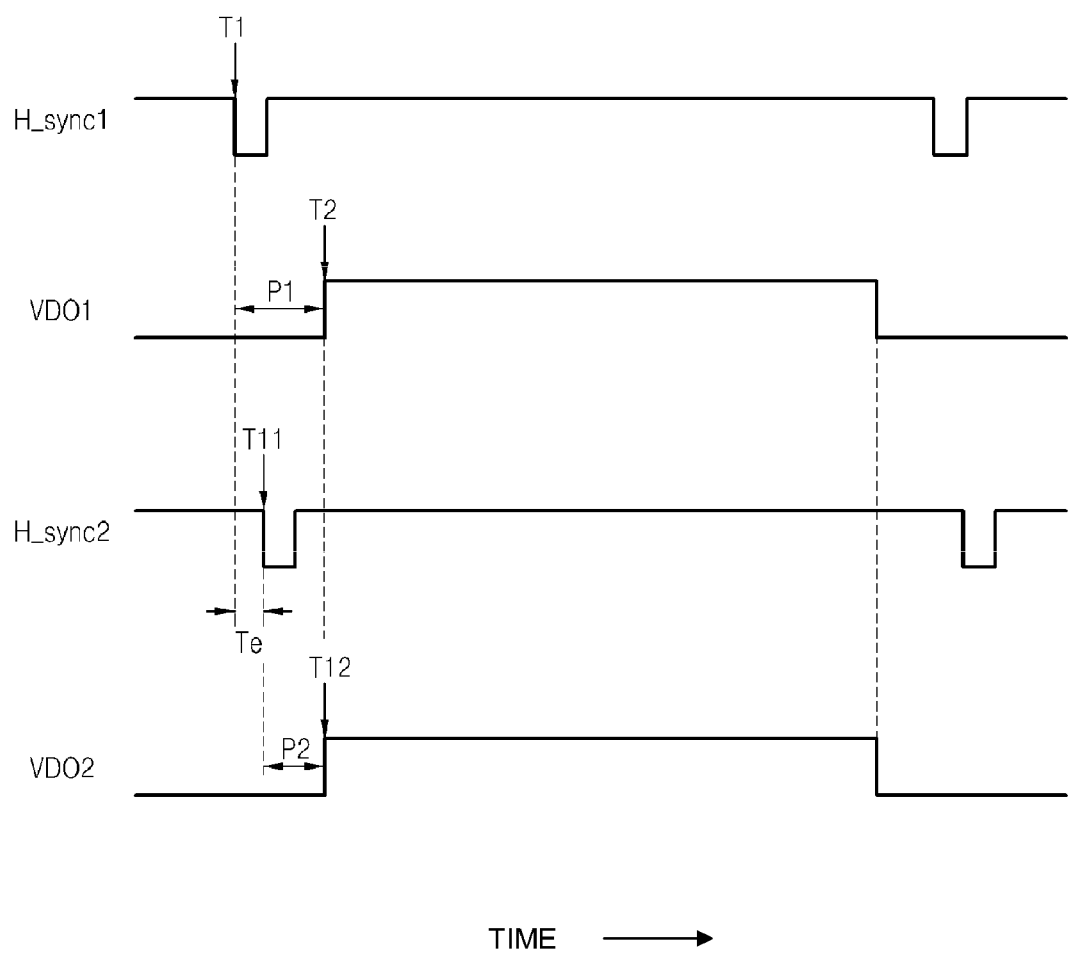
FIG. 4 is a view illustrating an operation in which an image forming apparatus corrects a recording time of video data, based on a positional deviation of horizontal synchronization signals, according to an exemplary embodiment of the present invention.

As illustrated in FIG. 4, the video controller 25 provides the laser scanning unit 100 with video data VDO1 to be recorded on a scanning surface at a time T2. The time T2 is obtained by applying a first offset period P1 to a start position T1 of horizontal synchronization signal H_sync1. The video controller 25 provides the laser scanning unit 100 with video data VDO2, to be subsequently recorded on the scanning surface at a time T12.

If horizontal synchronization signal H_sync2, of a subsequent scanning line (of the video data VDO2), are not synchronized with the previous horizontal synchronization signal H_sync1, a positional deviation Te may occur between the scan lines of video signals VDO1 and VDO2. Accordingly, the synchronization start position signal detector 23 provides the positional deviation detector 24 with synchronization start pulses, indicating the start position T1, of the previous horizontal synchronization signals H_sync1, and the start position T11, of the current horizontal synchronization signal H_sync2.

The positional deviation detector 24 detects a positional deviation Te, between the start position T1 of the previous horizontal synchronization signal H_sync1 and the start position T11 of the current horizontal synchronization signal H_sync2, and provides the detected positional deviation Te to the video controller 25.

The video controller 25 provides the laser scanning unit 100 with video data VDO2 to be recorded on a scanning surface at the time T12, obtained by applying a second offset period P2, which is smaller than the first offset period P1, to the start position T11, of the current horizontal synchronization signal H_sync2. The second offset period P2 is calculated by subtracting the positional deviation Te, from the first offset period P1.

Although the start positions of the horizontal synchronization signals change, depending on the position of the light beam incident to the optical sensor 10, a recording time of the video data can be controlled, based on the positional deviation thereof. Consequently, the recording times for video data of each scanning line can be continuously set.

The image forming apparatus 200 employs only one laser scanning unit 100. However, multiple laser scanning units can be used. For example, it is also possible to control the recording time of the video data, by correcting the horizontal synchronization signals, which are output from a plurality of laser scanning units, provided according to color images, based on the positional deviations thereof.

Figure 5:
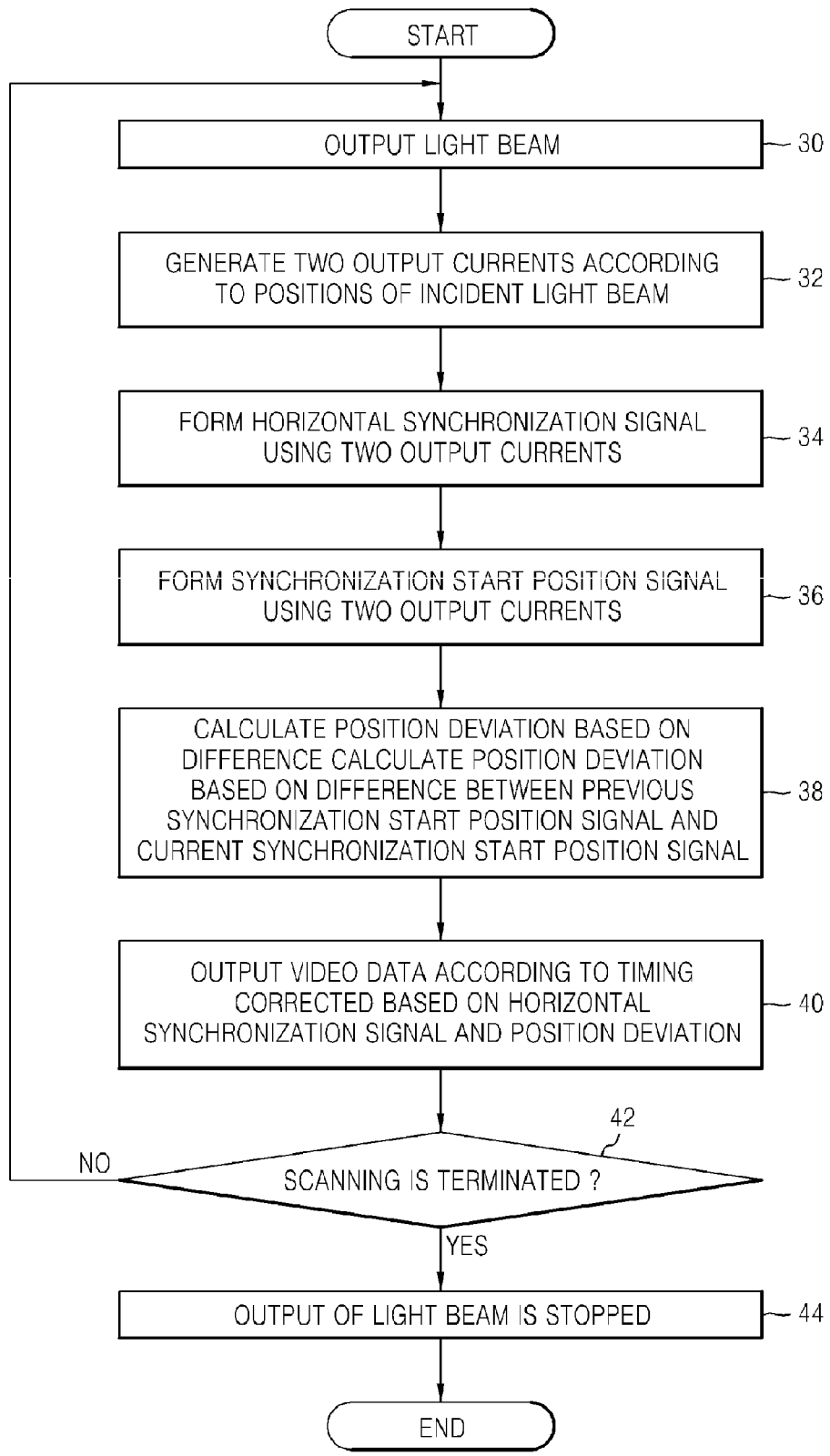
FIG. 5 is a flow diagram illustrating a control method of an image forming apparatus, according to an exemplary embodiment of the present invention.

Hereinafter, a method for controlling the image forming apparatus having the construction according to the present invention will be described with reference to FIG. 5. The laser scanning unit 100 outputs a horizontal synchronization signal and then outputs the light beam to scan video data of each scanning line (30). While not required, it is understood that aspects of the method can be implemented as computer software and/or firmware, stored on a medium, and which is implemented by a computer processor and/or controller.

The optical sensor 10 receives the light beam generated from the laser scanning unit 100 and outputs optical currents. In detail, the optical sensor 10 divides a bias current, input through the input terminal, into two output currents, according to the position of the light beam including the horizontal synchronization signal, amplifies the output currents, and outputs the amplified currents through the two output terminals as output currents Y1 and Y2 (32).

The output currents Y1 and Y2, output through the two output terminals, are digitally converted by the A/D converter 21, and are then provided to the synchronization signal detector 22 and the synchronization start position signal detector 23. The synchronization signal detector 22 forms a horizontal synchronization signal H_sync, using the output currents Y1 and Y2, and provides the horizontal synchronization signal H_sync to the video controller 25 (34).

The synchronization start position signal detector 23 detects a synchronization start position, using the output currents Y1 and Y2, and provides the detected synchronization start position to the positional deviation detector 24 (36).

The positional deviation detector 24 detects the positional deviation Te, between the start position T1 of the previous horizontal synchronization signal and the current start position T11 of the current horizontal synchronization signal, and provides the detected positional deviation Te to the video controller 25, as described in FIG. 4 (38).

The video controller 25 corrects and outputs a recording time of video data, based on the horizontal synchronization signal H_sync and the positional deviation Te (40).

The image forming apparatus determines if data scanning is terminated (42). If the data scanning is not terminated, the method returns to operation 30. If the data scanning is terminated, the output of the light beam is stopped (44).

According to aspects of the present invention, the positional deviation of horizontal synchronization signals is calculated, using two output currents generated based on the positions of light beam incident to an optical sensor. The recording time of the video data can be controlled, based on the positional deviation, so that high-quality images can be output, and an image forming apparatus that prints color images can efficiently perform the color image registration.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image forming apparatus comprising:
   a light source to output a light beam;
   an optical sensor to receive the light beam and to produce output currents according to positions of the light beam;
   a signal processor to detect horizontal synchronization signals that indicate starting positions of scanning lines of video data using the output currents, and to calculate correction signals to compensate for positional deviations of the horizontal synchronization signals; and
   a video controller to control recording times at which the scanning lines of the video data are recorded on a scanning surface, based on the horizontal synchronization signals and the correction signals
   wherein the signal processor comprises:
      a synchronization start position signal detector to detect a start position of each of the horizontal synchronization signals, according to the output currents output from the optical sensor; and
      a positional deviation detector to receive the detected start positions, to calculate the correction signals from positional deviations corresponding to differences between a detected start position of a previous horizontal synchronization signal and a detected start position of a current horizontal synchronization signal, and to output the correction signals to the video controller.

2. The image forming apparatus as claimed in claim 1, wherein the video controller sequentially sets the recording time of each scanning line, based on the corresponding positional deviation and horizontal synchronization signal.

3. The image forming apparatus as claimed in claim 1, wherein the signal processor further comprises a synchronization signal detector to output the horizontal synchronization signals according to the output currents.

4. The image forming apparatus as claimed in claim 1, wherein the image forming apparatus comprises a plurality of optical sensors, each corresponding to a different colored toner.

5. The image forming apparatus as claimed in claim 1, wherein the optical sensor comprises:
   an optical reaction area to receive the light beam;
   an input terminal to receive a bias current; and
   two output terminals to output the currents.

6. The image forming apparatus as claimed in claim 5, wherein the optical sensor receives a bias current through the input terminal, divides the bias current into two output currents Y1 and Y2, according to positions of the light beam on the optical reaction area, and outputs the two output currents Y1 and Y2 through respective ones of the output terminals.

7. The image forming apparatus as claimed in claim 6, wherein the optical sensor calculates a position T of each of the horizontal synchronization signals, by using the equation $T=(L/2)*[(Y1-Y2)/(Y1+Y2)]$,
   wherein L is a length of the optical reaction area and the output currents Y1 and Y2 correspond to each of the horizontal synchronization signals.

8. The image forming apparatus of claim 1, wherein video controller controls the recording times by adjusting offsets of the scanning lines by the positional deviations.

9. An image forming apparatus comprising:
   a light source to radiate a light beam;
   an optical sensor to detect a position of the light beam and to divide a bias current into two output currents, according to the position the light beam,
   wherein the optical sensor comprises:
      an optical reaction area to receive the light beam;
      an input terminal to receive the bias current; and
      two output terminals to output the output currents;
   a signal processor to use the output currents to detect horizontal synchronization signals indicating start times of scanning lines and synchronization start position signals corresponding to start positions of the horizontal synchronization signals, and to determine a positional deviation corresponding to a difference between a start position of a previously detected horizontal synchronization signal and the start position of a current horizontal synchronization signal; and
   a video controller to control a recording time at which video data is recorded on a scanning surface, based on the current horizontal synchronization signal and the positional deviation.

10. The image forming apparatus of claim 9, wherein the light beam comprises a video data beam and a horizontal synchronization signal beam.

11. The image forming apparatus of claim 9, wherein the video controller applies the positional deviation to an offset of the video data.

12. A method for controlling an image forming apparatus, comprising:
   detecting a current horizontal synchronization signal using output currents output from an optical sensor, according to a position of a received light beam on the optical sensor;
   detecting a start position of the current horizontal synchronization signal;
   computing a positional deviation corresponding to the detected start position of the current horizontal synchronization signal and a start position of a previous horizontal synchronization signal; and
   controlling a recording time of video data corresponding to the current horizontal synchronization signal, according to the current horizontal synchronization signal and the computed positional deviation.

13. The method as claimed in claim 12, wherein the computing of the positional deviation comprises calculating a difference between the start position of the previously detected horizontal synchronization signals and the start position of the current horizontal synchronization signals.

14. The method as claimed in claim 12, further comprising producing the output currents by dividing a bias current into first and second currents, according to the position of the received light beam, and amplifying the first and second currents to produce first and second output currents.

15. The method as claimed in claim 12, wherein the detecting of the start position of the current horizontal synchronization signal comprises detecting a synchronization start position signal corresponding to the start position of the current horizontal synchronization signal.

16. An image forming apparatus comprising:
   a light source to radiate light beams comprising video data and synchronization pulses corresponding to start times of the video data;
   an optical sensor to receive the synchronization pulses and to a divide a bias current into two output currents, according to positions of the synchronization pulses;

a signal processor to use the output currents to determine start positions of the synchronization pulses, and to determine positional deviations between the start positions of the synchronization pulses; and a video controller to control recording times at which scanning lines of the video data are recorded, by applying the positional deviations to offset periods of the scanning lines, in order to control a horizontal position of scan lines of the video data, wherein the signal processor determines the positional deviations by comparing the start time of a current one of the synchronization pulses with a previous one of the synchronization pulses.

17. The image forming apparatus of claim 16, wherein the optical sensor comprises:

an input to receive the bias current;

two outputs to output the output currents; and an optical reaction area to receive the light beams.

18. The image forming apparatus of claim 16, wherein the optical sensor is a position sensing detector.

19. A signal processor to synchronize scanning lines of video data, comprising:

a synchronization signal detector to detect horizontal synchronization signals that indicate starting positions of the scanning lines, using output currents of an optical detector;

a synchronization start position signal detector to detect a start position of the horizontal synchronization signals, according to the output currents; and a positional deviation detector to receive the detected start positions, to calculate correction signals from positional deviations corresponding to differences between a detected start position of a previous horizontal synchronization signal and a detected start position of a current horizontal synchronization signal, and to output the correction signals to synchronize the scanning lines.

20. The signal processor of claim 19, further comprising a video controller to control recording times at which the scanning lines of the video data are recorded on a scanning surface, based on the horizontal synchronization signals and the correction signals.

* * * * *